(12) United States Patent
Bentrim

(10) Patent No.: US 8,083,452 B2
(45) Date of Patent: Dec. 27, 2011

(54) PLASTIC-METAL HYBRID STANDOFF

(75) Inventor: Brian Bentrim, Furlong, PA (US)

(73) Assignee: PEM Management, Inc., Wilmington, DE (US)

( * ) Notice: Subject to any disclaimer, the term of this patent is extended or adjusted under 35 U.S.C. 154(b) by 440 days.

(21) Appl. No.: 12/420,393

(22) Filed: Apr. 8, 2009

(65) Prior Publication Data

US 2009/0257843 A1 Oct. 15, 2009

Related U.S. Application Data

(60) Provisional application No. 61/043,591, filed on Apr. 9, 2008.

(51) Int. Cl.
*F16B 37/04* (2006.01)

(52) U.S. Cl. ........ 411/180; 411/103; 411/108; 411/190; 411/259; 411/301; 411/427; 411/432; 411/531; 411/533; 411/900; 411/901; 411/902; 411/903; 411/904; 411/908

(58) Field of Classification Search .................. 411/103, 411/108, 533, 900–903, 180–182, 301, 432
See application file for complete search history.

(56) References Cited

U.S. PATENT DOCUMENTS

| | | | |
|---|---|---|---|
| 2,132,636 A * | 10/1938 | Maahs | 285/208 |
| 2,968,840 A * | 1/1961 | Morse | 264/265 |
| 3,174,523 A * | 3/1965 | Hult | 411/103 |
| 4,130,138 A | 12/1978 | Swanstrom | |
| 4,621,961 A * | 11/1986 | Gulistan | 411/352 |
| 4,732,519 A * | 3/1988 | Wagner | 411/337 |
| 5,165,834 A * | 11/1992 | Takenouchi et al. | 411/542 |
| 5,975,821 A * | 11/1999 | Kue | 411/533 |
| 6,059,503 A * | 5/2000 | Johnson | 411/353 |
| 6,883,538 B2 * | 4/2005 | Toyokawa et al. | 137/454.5 |
| 7,179,033 B2 * | 2/2007 | Ghiran | 411/179 |
| 2006/0291975 A1 * | 12/2006 | Ghiran | 411/181 |
| 2008/0226413 A1 * | 9/2008 | Stephen | 411/82.1 |
| 2010/0119328 A1 * | 5/2010 | Dai | 411/432 |

* cited by examiner

*Primary Examiner* — Victor Batson
*Assistant Examiner* — Tyler Johnson
(74) *Attorney, Agent, or Firm* — Gore & Associates, PLLC

(57) ABSTRACT

A hybrid clinch-type standoff consists of two component parts, a metal core base and a overmolded plastic barrel. The base has a through-bore and a displacer flange at the bottom. A first undercut is located immediately above the flange and extends upwardly along an outside surface of the base for providing clinch attachment of the base to a substrate. A frustoconical ramp convergent in the upward direction lies along the outer surface of the base is and is located directly above the first undercut. An axially extending segmented ring with circumferential teeth is located at the top of the base. The overmolded plastic tubular barrel composed of plastic fills the second undercut and surrounds the segmented ring. The barrel has an inner portion including a threaded inner wall which extends downardly inside the through-bore to a point flush with the bottom of the flange.

9 Claims, 3 Drawing Sheets

PLASTIC-METAL HYBRID STANDOFF

RELATED APPLICATION

This patent application is a non-provisional of provisional patent application Ser. No. 61/043,591 entitled "Plastic-Metal Hybrid Standoff" filed on Apr. 9, 2008, priority from which is hereby claimed.

FIELD OF THE INVENTION

The present invention relates to a standoff fastener with a metal base that permanently attaches into sheet metal, a PC board, or other substrate, either by clinching, broaching, flaring or the like and is affixed to an overmolded plastic portion extending upwardly from the base.

BACKGROUND OF THE INVENTION

Standoffs exist to create space between two objects. They are typically not designed as structural or high strength fasteners. There are many derivatives of standoffs including plastic-snapping pieces, male-female threaded fasteners, surface mounting, broaching, flaring and even clinching fasteners. A relatively hard base is intrinsic to the clinching process. Clinch-type standoffs are produced by a machine process which is fairly slow and costly. Despite advances in the art, cost-reduction options have drawbacks. Especially problematic are long standoffs that need to create relatively large gaps between objects. U.S. Pat. No. 4,130,138 entitled Molded Standoff discloses a metal/metal standoff with a machined base and an overmolded metal standoff collar composed of zinc. This device has many limitations including its high cost to produce and its inability to provide electrical insulation between interconnecting components, among other disadvantages. There is therefore a need in the art for a clinch-type standoff which is inexpensive to produce in longer lengths while providing a durable and sturdy structural connection between components.

SUMMARY OF THE INVENTION

In order to solve the problem in the art, the present invention combines the necessary hard base with an overmolded plastic extension that provides the desired standoff distance and attachment means such as threads if required. According to the invention, the only exposed portion of the base not covered by the plastic is the displacer, the undercut and part of the ramp. These are the parts that are active in the clinch process. The displacer firmly encounters both the sheet material and the anvil. It withstands the forces of the clinch installation process without deforming as the sheet material flows into the undercut. The strong metal undercut provides ample axial resistance to pushout while the shaped metal displacer provides torque resistance. The ramp resists the abrasive impact of placing the part into the hole without marring a plastic surface. In other embodiments, the exposed area of the base could include such features as flaring, snapping features, broaching, or even surface mounting features.

More specifically, the applicant has invented a standoff fastener comprising a substantially cylindrical base with a through-bore and a flange at the bottom. A first undercut is located immediately above the flange and extends upwardly along an outside surface of the base for providing attachment of said base to a substrate. A ramp convergent in the upward direction is located directly above the first undercut. A second undercut on the outside surface of the base extends upwardly from the ramp for retaining overmolding material. An axially extending, segmented ring comprising circumferential teeth is located along a top edge of the second undercut. An overmolded tubular barrel composed of plastic filling the second undercut and surrounding the segmented ring. The barrel has an inner portion extending downwardly inside the through-bore to a point flush with a bottom of the flange.

This invention reduces the part cost, especially in longer versions because machined versions use bar stock and much of the material is lost as waste (chips), a condition exaggerated in longer sizes. Forged versions are being experimented with and currently are being produced in some limited sizes, however, forging is limited to the length of part that can be made. The invention allows for the base component to be forged and therefore have a very low cost to manufacture and no waste. The long barrel is overmolded plastic which is considerably less expensive than metal alternatives and creates no waste. The end result is a standoff that is produced without waste at a much reduced cost.

One primary advantage of this invention is the flexibility in selecting the barrel length which is a common variable of a standoff for a given application. It is not uncommon to offer dozens of different lengths of barrel for a single thread and clinch size part. For machining, this requires various different tooling packages and setups on the equipment. For forged versions, this requires a different, and thus expensive, tool setup for each variation. The invention allows for a single base component to be utilized in a variety of barrels with different thread sizes as the insert for an overmolding process. The overmolding process puts the barrel onto the part and utilizes an adjustable depth to the mold allowing for the single tool to make any length of barrel. If threads are needed, they are added in as a secondary tapping process.

As an example of the advantage the invention provides, one manufacturer currently offers in its standard standoff line eleven different combinations of thread size and barrel diameter, plus another twelve unthreaded combinations for a total of twenty-three standard combinations. Each of these twenty-three combinations has a dozen or more lengths. All these combinations would require their own setups and tools. With this invention, only three bases would be required and three adjustable overmold tools would produce all combinations, which secondary tapping required only for the threaded versions. To accomplish other fastening means, such as flaring, broaching, surface mounting, etc., only three bases need to modified but the molded standoff portion can remain common to all designs. This also allows for better-managed tools and inventories of product. It speeds up the manufacturing time by allowing the manufacturer to stock large quantities of the three base components which are overmolded to order.

Other benefits are achieved by using the plastic material rather than metal as disclosed in prior art U.S. Pat. No. 4,130,138 mentioned above. First, it acts as an insulator to the assembly where a metal standoff would be a conductor. The fastener could also function as an insulating nut if not utilized for its standoff capabilities. In addition, the plastic can be colored which can help ease and standardize later assembly designs. Colors can be used to note warnings (red) or access (green) and can be used to simplify instructions, i.e. "Attach the screw through the board and into the blue standoff." Plastic also reduces weight in the final assembly.

In summary, this proposed design allows for a standoff to be produced for lower cost than many competitive products and with no waste. It also allows for more efficient component management due to the flexibility inherent in the design and manufacturing processes. Lastly, the plastic design offers color coding options, weight reductions and insulative properties.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DESCRIPTION OF THE PREFERRED EMBODIMENT

Figure 1:
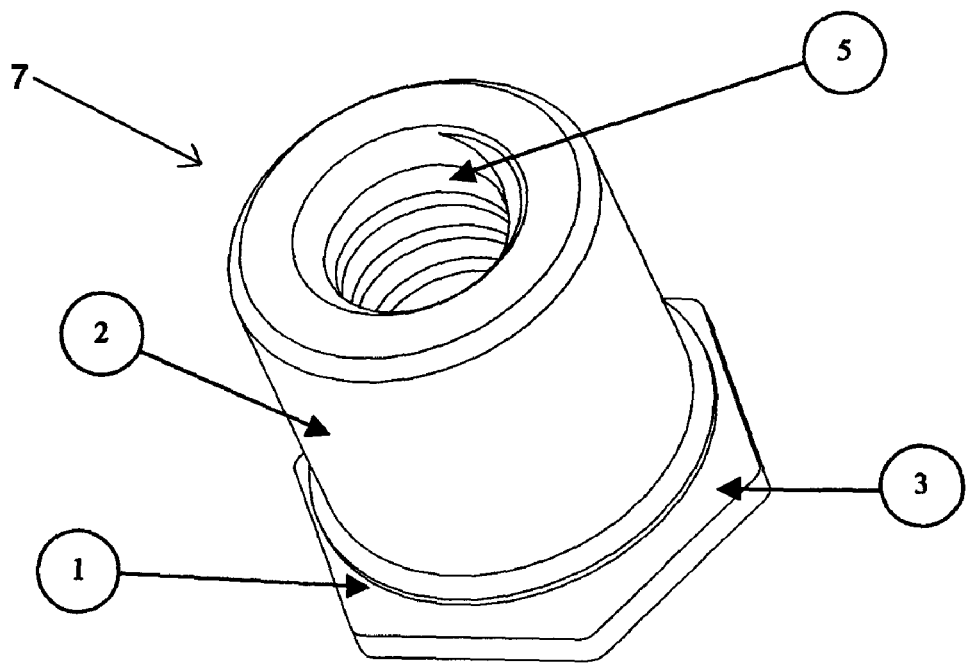
FIG. 1 is a top right isometric view of the standoff of the invention.
Figure 2:
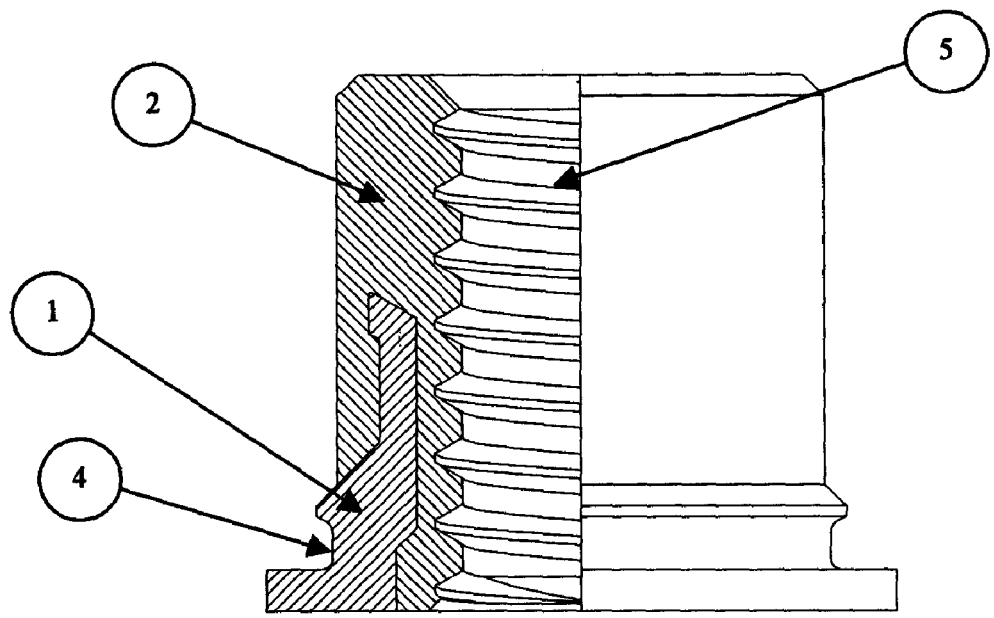
FIG. 2 is a side elevation partial sectional view.
Figure 4:
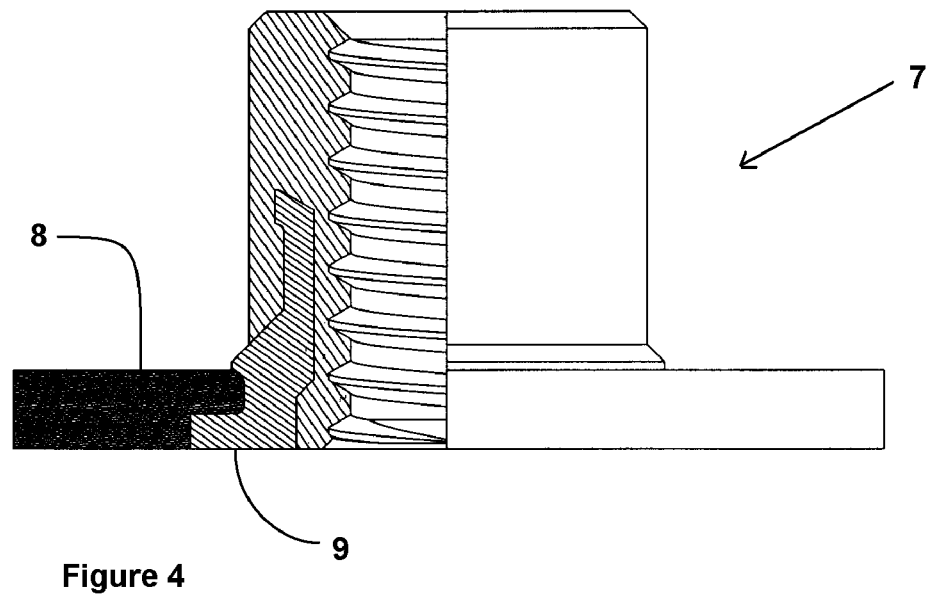

Referring now to FIGS. 1 and 2, one embodiment of the invention is a hybrid clinch standoff 7 that consists of two component parts, one metal and one plastic. The clinching base 1 is metal while the standoff portion or barrel 2 is plastic. Clinching requires the fastener to be harder than the sheet metal panel that is receiving the part; therefore, the base can be composed of aluminum, steel, stainless, hardened, plated or what is otherwise needed to achieve the clinch. Molded to the metal base is a plastic standoff barrel 2. The barrel is a generally round cylinder produced to various incremental lengths that support a second sheet or component (not shown). The barrel in this figure is through-threaded 5. This allows a machine screw to be engaged through the second supported panel into the standoff for its attachment. Alternate embodiments include an unthreaded barrel that could accept a thread-forming or a thread-cutting screw or allow a clearance for a through-screw. A solid barrel could also be produced that would allow a second sheet to simply rest on or be supported by the standoff 7 but not be otherwise attached to what it supports. The alternate embodiments also include open barrels, either threaded or unthreaded, and blind barrels, threaded or unthreaded. The base is shaped to clinch into sheet metal with traditional clinching elements (displacer, undercut and anti-rotational elements). In this preferred embodiment, a hex displacer 3 also functions as the anti-rotational element with an undercut 4 that is largely rectangular in cross-section. This embodiment allows the displacer to install flush to a sheet as shown in FIG. 4. Many other varieties of elements could be combined to produce the clinch as demonstrated by the wide range of clinch fasteners currently on the market well-known in the art.

Figure 3:
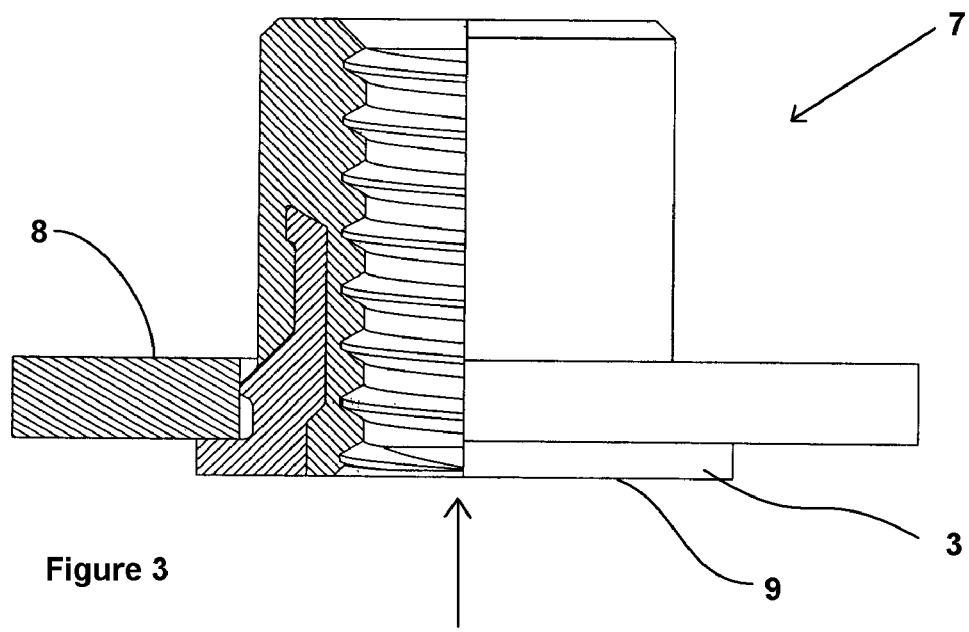
FIG. 3 and FIG. 4 are partial side elevation sectional views showing the sequence of installation of the invention into a substrate sheet.

Referring now to FIGS. 3 and 4, the sequence of installation is shown. Standoff 7 is initially placed in alignment with a hole in substrate sheet 8 to be forced upwardly by pressure applied to the bottom 9 of clinch flange 3. After the installation is completed as shown in FIG. 4, the bottom of the base 9 is flush with the substrate 8 and the undercut has been completely filled by the cold flow of material from substrate 8.

Figure 5:
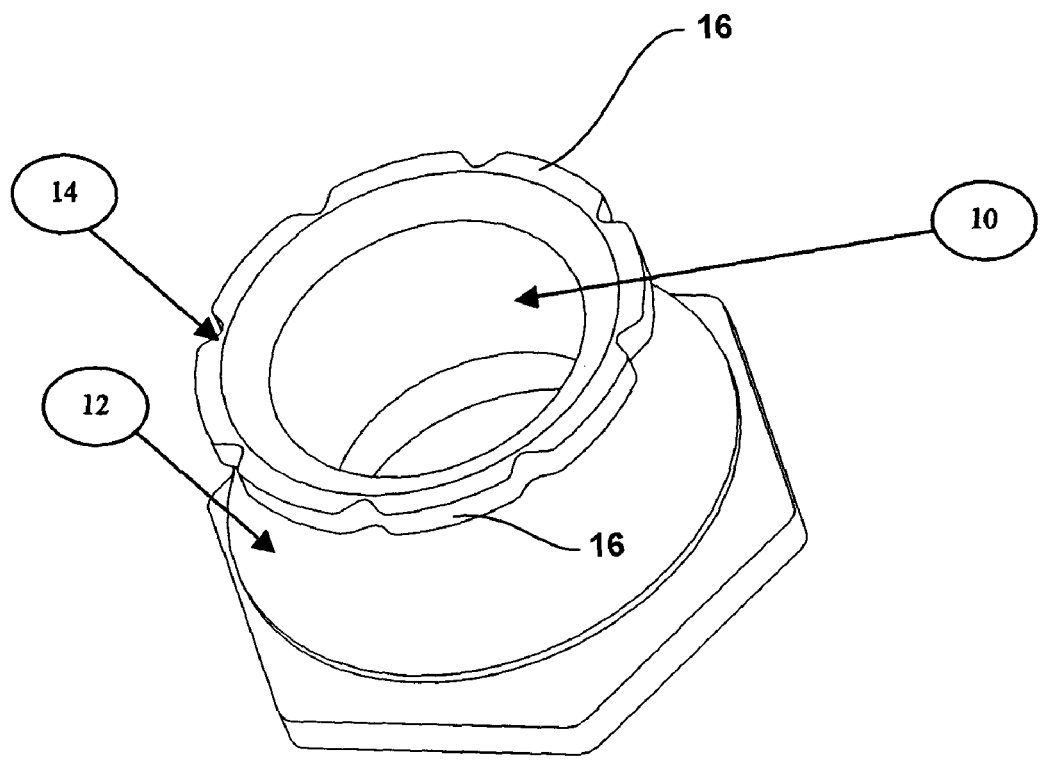
FIG. 5 is a top right isometric view of the base component.
Figure 6:
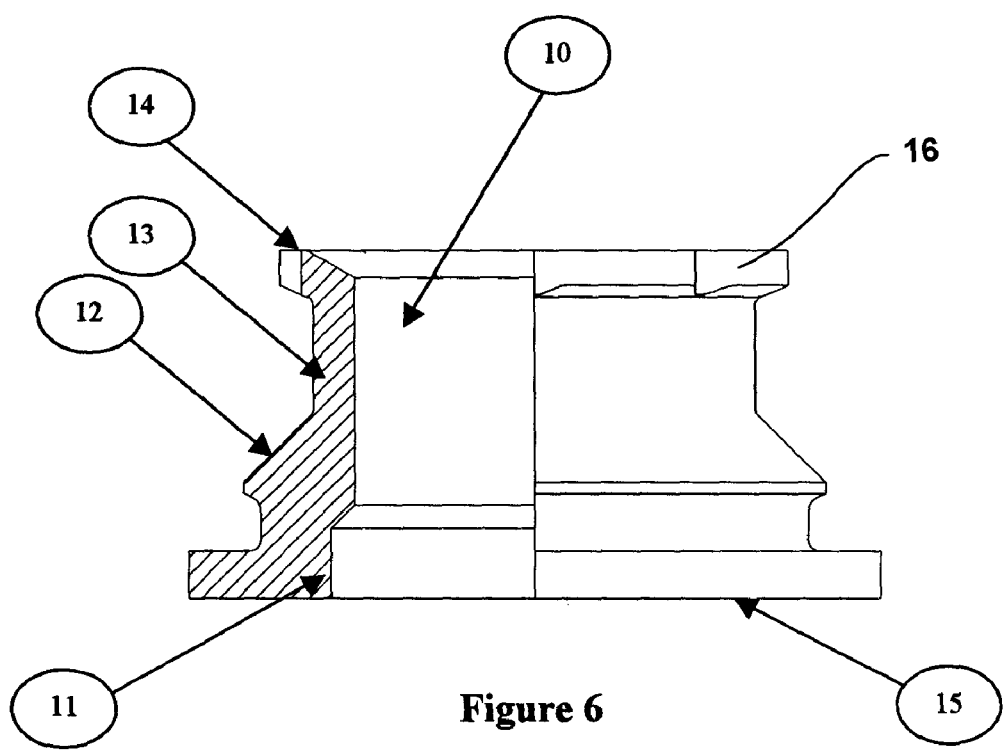
FIG. 6 is a side elevation partial sectional view of the base component.

Referring now to FIGS. 5 and 6, the base includes a through hole 10 that has a wide clearance for the bottom portion of the barrel and threads that will later be formed into the inside of the barrel. This allows the plastic to flow along the inside of the base, better joining the base to the barrel and ensures that there is sufficient plastic material even at the major diameter of the threads so that there will be no metal-to-metal contact between the screw and the base. This eliminates galvanic corrosion as well as isolates the screw to prevent conductivity. The base also includes a counter-bore 11 in the through hole that provides part of the axial holding strength in the base-to-barrel joint.

The outside of the base includes a flange at the bottom and directly above the flange is a first undercut for providing attachment of the base to a substrate. A ramp 12 above the clinch extends into a long undercut section 13, terminating at a segmented ring 14 at the top. The segmented ring and undercut are completely enclosed by the plastic of the barrel. The undercut provides strong axial holding strength in the base-to-barrel joint, while the teeth 16 of the ring provide torque resistance so that the barrel does not spin on the base. The ramp serves two purposes: First, it allows the mold tooling a surface with which to close off the cavity. This provides a firm, positive stop for mold tooling, ensuring that there is no leakage of plastic outside of the barrel. Secondly, the ramp guides the fastener into the mounting hole in the sheet to provide smooth installation of the fastener into the clinching mounting hole.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A standoff fastener comprising:
a substantially cylindrical metal base having a through-bore and a radially extending displacer flange at the bottom;
a first undercut immediately above the flange extending upwardly along an outside surface of the base adapted for providing attachment of said base to a substrate;
a ramp convergent in the upward direction located on said outside surface directly above the first undercut;
a second undercut on said outside surface extending upwardly from said ramp adapted for retaining overmolding material;
an axially extending, segmented ring at the top of said base comprising circumferential teeth located along a top edge of said second undercut; and
an overmolded tubular plastic barrel extending upwardly from said base, said barrel filling said second undercut and surrounding said segmented ring, said barrel further having an inner portion comprising a cylindrical inner wall extending downwardly inside said through-bore to a point flush with a bottom of said flange.

2. The fastener of claim 1 wherein the inner wall of said barrel is of constant diameter and extends from an opening at the top of said fastener to an opening at the bottom.

3. The fastener of claim 2 wherein the inner wall of said barrel is threaded.

4. The fastener of claim 2 including a co-axial counter-bore extending from the bottom of said base upwardly along a portion of said through-bore, said counter-bore being of greater diameter than said through-bore.

5. The fastener of claim 1 further including an outer portion of said barrel which extends downwardly from a top of said barrel terminating along a bottom edge which abuts said ramp, at least a portion of said ramp being frustoconical and defining an outer surface of said fastener.

6. The fastener of claim 5 wherein said flange is polygonal.

7. The fastener of claim 6 wherein said flange is hexagonal.

8. An assembly of parts comprising the fastener of claim 4 rigidly affixed to a planar sheet by clinch attachment to a sidewall of a hole in said sheet wherein material of said sheet fills said first undercut.

9. The assembly of claim 8 wherein the bottom of said flange is flush with an underside surface of said sheet.

* * * * *